United States Patent [19]

St. John

[11] 4,020,936
[45] May 3, 1977

[54] CENTRIFUGAL CLUTCH WITH CENTRIFUGAL DETENT

[75] Inventor: Richard C. St. John, North Canton, Ohio

[73] Assignee: Aspro, Incorporated, Fairfield, Conn.

[22] Filed: Oct. 29, 1975

[21] Appl. No.: 626,718

[52] U.S. Cl. .................. 192/105 BA; 192/114 R
[51] Int. Cl.² ................................. F16D 43/14
[58] Field of Search ............ 192/105 BA, 105 CD, 192/105 CE, 103 B, 114 R

[56] References Cited

UNITED STATES PATENTS

| 1,689,913 | 10/1928 | Carrey | 192/105 BA |
| 2,534,133 | 12/1950 | Kirkpatrick | 192/105 BA |
| 3,026,980 | 3/1962 | Hoff | 192/105 BA |

FOREIGN PATENTS OR APPLICATIONS

| 645,248 | 10/1950 | United Kingdom | 192/105 BA |

*Primary Examiner*—Benjamin W. Wyche
*Attorney, Agent, or Firm*—Frease & Bishop

[57] ABSTRACT

A centrifugal clutch construction having an outer driven member and an inner driving rotor assembly. The rotor assembly has a pair of spaced, radially extending, side plates mounted in fixed positions on a driving shaft, and a core fixed to the shaft between the side plates. The core is provided with diametrically opposite surfaces engaging and supporting associated pairs of clutch shoes when the shoes are in retracted position. A release plate is slidably mounted between each pair of clutch shoes, and the release plates and clutch shoes are retained in retracted position on the core by pairs of clamping balls. The balls are located mainly within holes formed in each pair of clutch shoes and portions of the balls project partially into openings formed in the side plates. Each pair of balls frictionally clamps a release plate therebetween when the clutch is in disengaged position. The release plates move radially outwardly under the influence of centrifugal force and overcome the clamping and friction forces of the retaining balls when the shaft reaches a predetermined speed. The balls then move laterally of the side plates inwardly toward each other into U-shaped slots formed in the release plates and out of engagement with the side plates, whereupon the clutch shoes snap into engagement with the outer driven member.

21 Claims, 14 Drawing Figures

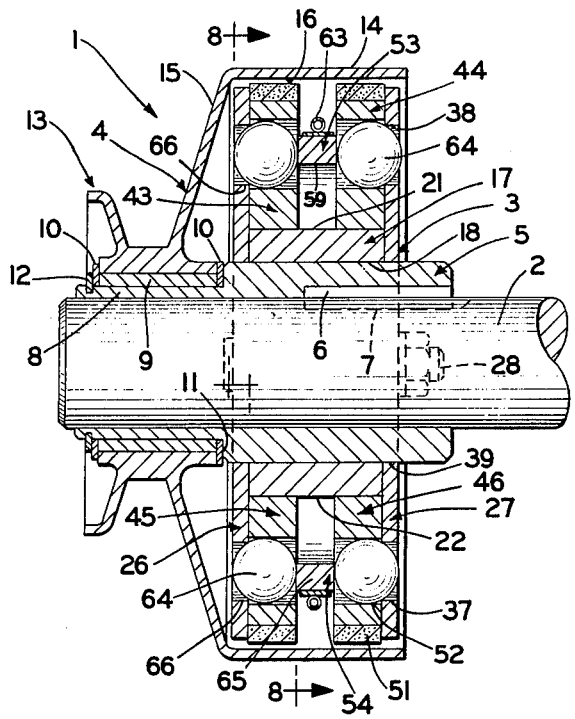
FIG.1
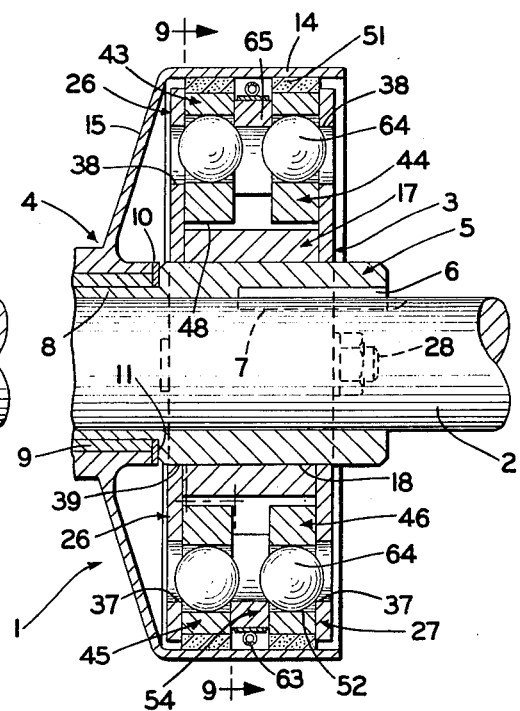
FIG.2
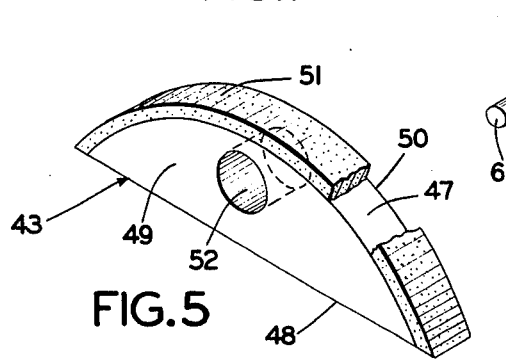
FIG.5
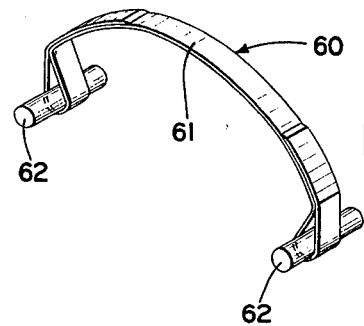
FIG.7
FIG.6
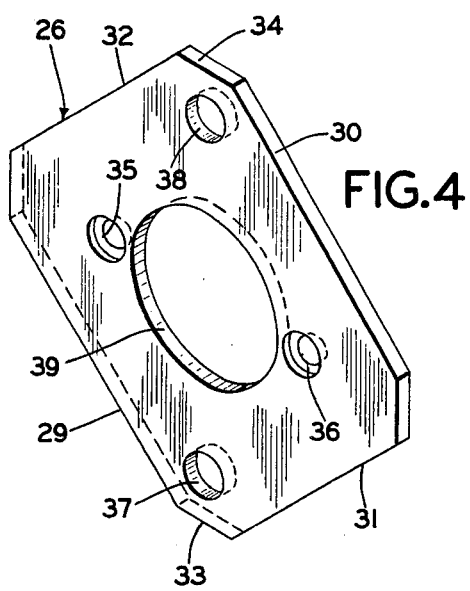
FIG.4
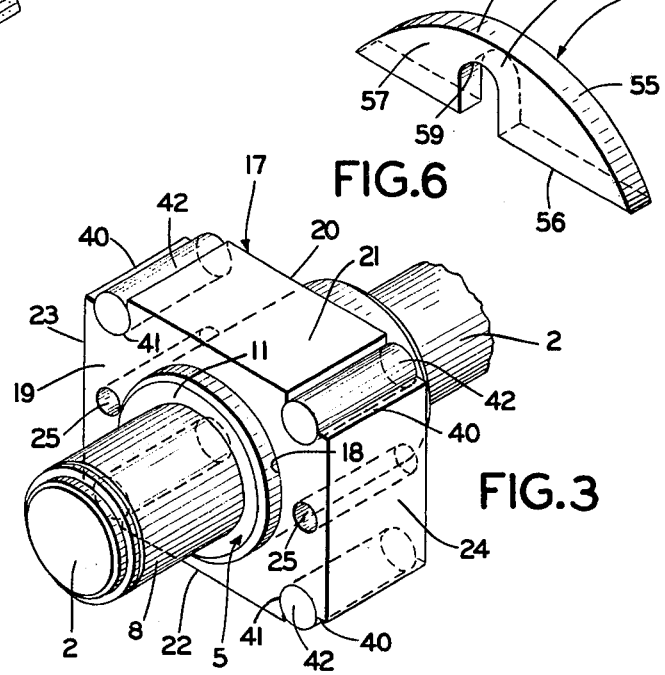
FIG.3

4,020,936

CENTRIFUGAL CLUTCH WITH CENTRIFUGAL DETENT

BACKGROUND OF THE INVENTION

1. Field of the Invention

The invention relates to clutches and more particularly to clutches which are operated automatically by centrifugal force at a predetermined speed of rotation so as to connect a driving member to a driven member or load. More particularly, the invention relates to a centrifugal clutch construction in which the driving and driven members are coupled together instantaneously upon the driving member reaching a predetermined speed, which engagement speed is considerably higher than the disengagement speed of the coupled members.

2. Description of the Prior Art

There are numerous types and arrangements of centrifugal clutch constructions in which one or more clutch shoes are retained in retracted position until sufficient centrifugal forces act on the shoes to overcome a retaining spring whereupon the clutch shoes move outwardly and engage a stationary clutch drum. Such clutch constructions experience excessive wear of the clutch shoes linings since the coupling engagement is gradual as the driving member comes up to engagement speed resulting in undesirable slippage and heating between the shoe lining material and driven member.

Various centrifugal clutch constructions have been developed to provide a more sudden or instantaneous engagement of the clutch shoes with the clutch drum to eliminate such undesirable wear and heating. Many of these delayed action clutch constructions are spring means to retain the clutch shoes in retracted position and to actuate the rapid engagement. Examples of such clutch constructions are shown in U.S. Pat. Nos. 1,737,825, 2,000,713, 3,367,463, and 3,752,285.

Other clutch constructions use other delay engagement means, such as a fluid dashpot as shown in U.S. Pat. No. 3,850,276, while still other clutch constructions use spring means to achieve an instantaneous disengagement of the clutch shoes from the driven member as opposed to instantaneous engagement. Examples of these clutch constructions are shown in U.S. Pat. Nos. 2,534,133, 2,755,902, and 3,367,463.

The use of springs or spring biased members as one of the principle components to achieve this instantaneous engagement feature presents problems in that a spring's characteristics are affected by change in ambient temperature, age, wear, etc., and the springs are subject to breakage and maintenance problems.

There is no known clutch construction of which I am aware which provides an instantaneously engageable clutch construction which engages at a considerably higher speed than its disengagement speed without the use of springs or fluid dashpot means as a primary retention means delaying engagement; and in which a high engagement speed is attained with a high mass clutch to produce a high coupling torque in comparison with known clutch constructions requiring a low mass clutch to achieve such a high speed engagement level with the resulting lower coupling torque.

SUMMARY OF THE INVENTION

Objectives of the invention include providing a centrifugal clutch construction in which the clutch shoes are prevented from moving outwardly by friction forces exerted on the shoes until a predetermined, relatively high speed of rotation is reached and in which the shoes then move outwardly in a sudden and instantaneous manner to their full extent of outward movement to cause a tight coupling engagement between the driving and driven members; providing such a clutch construction which is engageable instantaneously at a high speed, and in which the clutch has considerably less mass than heretofore required by known clutch constructions in order to achieve such instantaneous high speed engagement; providing a clutch construction which eliminates the use of springs or spring biased means as the primary means which retains the clutch shoes in retracted position until the engagement speed has been reached; providing a clutch construcion in which the clutch shoes are slidably, pivotably engaged with spaced pairs for camming roller pins to provide a self-energizing action of the clutch shoes, and to provide uniform engagement of the clutch shoe linings with the clutch drum reducing uneven lining wear and excess heating; and providing a centrifugal clutch construction which is of a realtively simple arrangement, easy to manufacture and assemble, strudy and durable in use, and which eliminates difficulties heretofore encountered with other known clutch constructions, achieves the objectives indicated, and solves problems and satisfies needs existing in the art.

These objectives and advantages are obtained by the centrifugal clutch construction, the general nature of which may be stated as including a driven clutch member; a drive shaft; a pair of spaced radially extending side plates mounted in a fixed position on the drive shaft for rotation with said shaft; core means mounted on the drive shaft between the spaced side plates for rotation with said side plates and drive shaft, said core means having diametrically opposite surfaces; spaced pairs of shoe means mounted between the side plates and movable radially between retracted and extended positions, the shoe means being supported by the core means surfaces when in retracted position; the shoe means each having a frictional coupling surface adapted to drivingly engage the driven clutch member when in extended position; release plate means slidably mounted between each pair of shoe means and adapted to move radially outwardly under the influence of centrifugal force; ball means mounted between the side plate means and engaged with the release plate means and the shoe means when the shoe means are in retracted position restraining outward radial movement of said release plate means and shoe means; the release plate means being adapted to move radially outwardly under the influence of centrifugal force and disengage from the ball means when the drive shaft reaches a predetermined speed whereupon the clutch shoes snap outwardly from retracted to extended position and drivingly engage the driven clutch member; the shoe means and side plates being formed with openings, said openings being in axial alignment when the shoe means are in retracted position; the ball means being mounted within the shoe means openings and projecting into adjacent side plate openings with the release plate means being clamped between an opposed pair of said ball means; the release plate means being formed with openingmeans into which the ball means move when disengaging the release plate means; spring means operatively engaged with the release plate means to return the release plate means and shoe means to retracted positions when the drive shaft reaches a predetermined disengagement speed; means operatively engageable with the release plate means and shoe means limiting the outward radial movement of the release plate means; and camming means mounted on the core means and engageable with the shoe means providing a self-energizing action when the shoe means engage the driven clutch member.

BRIEF DESCRIPTION OF THE DRAWINGS

A preferred embodiment of the invention — illustrative of the best mode in which applicant has contemplated applying the principles — is set forth in the following description and shown in the drawings and is particularly and distinctly pointed out and set forth in the appended claims.

FIG. 1 is a sectional view of the improved centrifugal clutch construction in disengaged position;

FIG. 2 is a view similar to FIG. 1 with the improved clutch construction shown in engaged position;

FIG. 3 is a perspective view of the clutch core and self-energizing roller pins mounted on the hub and driving shaft of the improved clutch construction;

FIG. 4 is a perspective view of one of the side plates of the clutch rotor assembly;

FIG. 5 is a perspective view, with portions broken away and in section, of one of the clutch shoes;

FIG. 6 is a perspective view of one of the clutch shoe release plates;

FIG. 7 is a perspective view of the strap and rod assembly which controls movement of the clutch shoes and release plates of FIGS. 5 and 6.

Similar numerals refer to similar parts throughout the drawings.

DESCRIPTION OF THE PREFERRED EMBODIMENT

Figure 10:
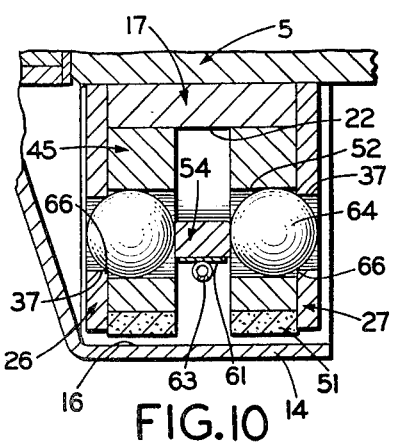
FIG. 10 is an enlarged, fragmentary, sectional view of the lower portion of FIG. 1 showing the clutch shoes and release plate in retracted positions.
Figure 11:
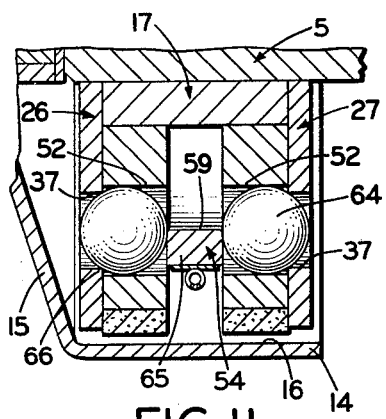
FIG. 11 is a view similar to FIG. 10 showing the clutch shoes in retracted position and the release plate in an intermediate position.
Figure 12:
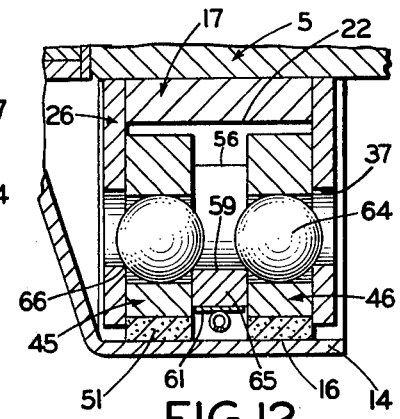
FIG. 12 is a view similar to FIGS. 10 and 11 showing the release plate and clutch shoes in fully expanded positions.

The improved clutch construction is indicated generally at 1 and is shown particularly in FIGS. 1 and 2. Clutch 1 is driven by a power driving shaft 2, and includes a rotor assembly 3, and a driven clutch member 4. Clutch assembly 1 is shown in disengaged position in FIG. 1 and in driving engaged position in FIG. 2.

Rotor assembly 3 has a hub 5 which is journalled on shaft 2 and connected thereto by a key 6 engaged within a keyway 7 formed in shaft 2. Hub 5 has a reduced end 8 on which driven clutch member 4 is rotatably mounted by a bearing ring 9. Bearing ring 9 is located between a pair of thrust washers 10 which are maintained in position against a shoulder 11 formed on hub 5 by a retaining snap end ring 12.

Clutch member 4 is shown as an integral pulley-clutch housing having a V-groove pulley end formation 13 connected to a cylindrical housing drum wall 14 by an elongated V-groove flange 15. The inner surface 16 of housing wall 14 provides the coupling surface for drivingly connecting clutch member 4 with rotor assembly 3. Clutch member 4 may have various configurations and arrangements, and may be adapted to be operatively engaged with various mechanisms other than a V-groove pulley belt without departing from the concept of the present invention.

Rotor assembly 3 includes a core 17 (FIG. 3) which is mounted on hub 5 by a splined force-fit connection so as to rotate with hub 5 and shaft 2. Hub 5 is mounted within a central opening 18 formed in core 17. Core 17 preferably is an integral block of metal generally rectangularly-shaped in cross section defined by opposed side surface 19 and 20, and opposed parallel pairs of end surfaces 21–22 and 23–24. Core 17 is formed with a pair of diametrically opposite holes 25 for mounting a pair of side plates 26 and 27 (FIG. 4) on core 17 by bolts 28, rivets or other fastening means (FIGS. 1 and 2).

Plates 26 and 27 are similar, each preferably having a generally diamond-like shape defined by two pairs of parallel edges 29–30 and 31–32, with edges 29 and 31, and edges 30 and 32 being joined by two pairs of parallel, diametrically opposed straight edge segments 33 and 34, respectively (FIG. 4). Plate 26 and 27 may be circular or of other various coonfigurations without affecting the operation of clutch 1.

Plates 26 and 27 are each formed with a pair of opposed mounting holes 35 and 36 through which bolts 28 extend to mount plates 26 and 27 on core 17. A larger pair of diametrically opposite holes 37 and 38 is formed in each plate 26 and 27 adjacent straight edge segments 33 and 34, respectively, the purpose of which is discussed below. Plates 26 and 27 also are formed with enlarged central openings 39 complimentary to core opening 18 for receiving shaft hub 5 therethrough.

Core 17 is provided with a stepped shoulder 40 at each of the four corners of core 17 at the junctions of end surfaces 21–24, 24–22, 22–23, and 23–21 (FIG. 3, 8 and 9) with an axially extending groove 41 being provided therein. Grooves 41 each have a generally three-quarter circular cross-sectional configuration which forms a pocket for receiving and rotatably mounting a roller pin 42. Pins 42 are restrained axially within pockets 41 by side plates 26 and 27.

Figure 8:
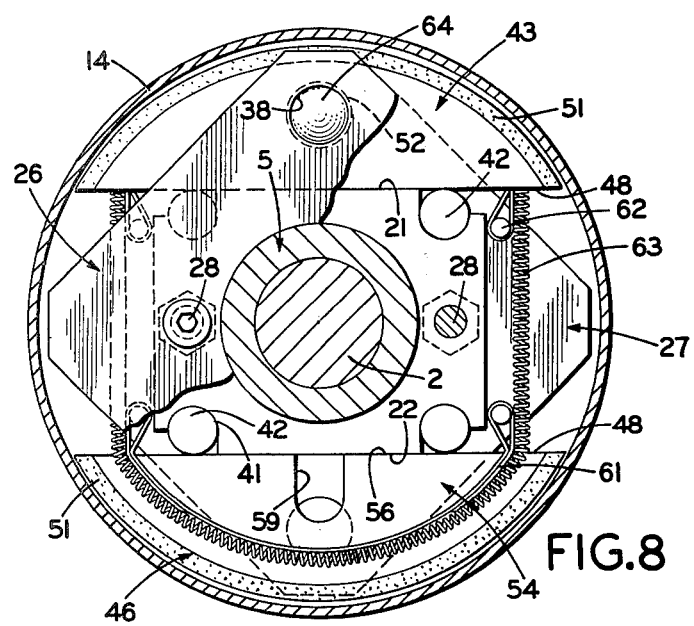
FIG. 8 is a sectional view taken on line 8—8, FIG. 1 showing the clutch shoes in retracted disengaged position.
Figure 9:
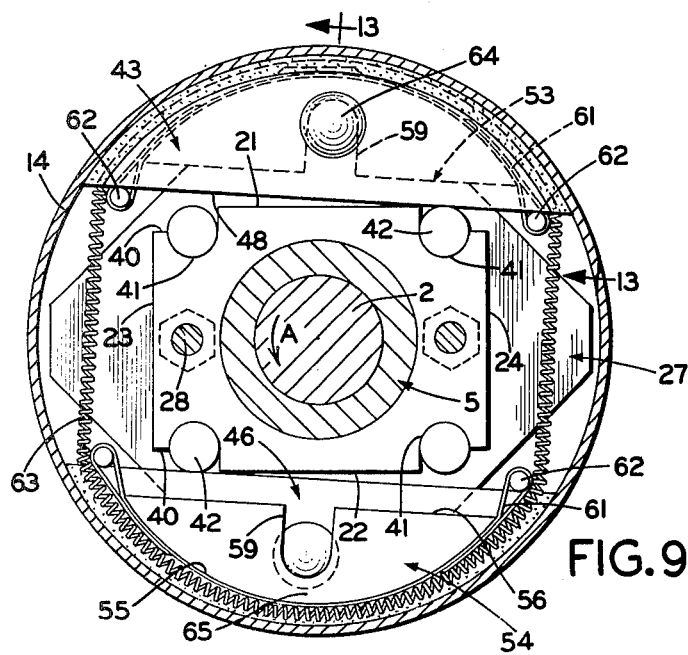
FIG. 9 is a sectional view taken on line 9—9, FIG. 2 showing the clutch shoes in expanded engaged position with the clutch drum.

Core end surfaces 21 and 22 provide a pair of parallel surfaces for supporting spaced pairs of clutch friction shoes 43–44 and 45–46, respectively, (FIGS. 1, 2 and 8), which surfaces 21–22 when extended are tangent to the outer surface of pins 42 as shown in FIGS. 8 and 9.

Clutch shoes 43–46 are similar, therefore, only shoe 43 is shown in FIG. 5 and is described in detail. Shoe 43 in cross-section is a segment of a circle and is formed by an arcuate surface 47, a flat chordal surface 48 and segmented side web surfaces 49 and 50. A strip 51 of friction material is mounted on arcuate surface 47 for clutching driving engagement with surface 16 of driven member 4. A circular hole 52 is formed through each shoe 43–46, the purpose of which is discussed below.

In accordance with the invention, release plates 53 and 54 are mounted between the spaced pairs of clutch shoes 43–44 and 45–46, respectively, (FIGS. 1, 2 and 6). Release plates 53 and 54 are similar, each being in cross-section a segment of a circle having an arcuate surface 55 with a radius of curvature equal to that of clutch shoes 43–46. Release plates 53 and 54 also have flat chordal surfaces 56 and side surfaces 57 and 58. An inverted U-shaped slot 59 is formed in each plate 53 and 54 and extends from chordal surface 56 inwardly to adjacent arcuate surface 55.

A strap and rod assembly 60 (FIG. 7) is associated with each pair of clutch shoes and release plate to insure uniform movement of the individual shoes of the pair, and to prevent the release plate from contacting coupling surface 16 of driven member 4. Assembly 60 includes a flat steel strip 61 having a rod 62 attached to each end of strip 61. Strips 61 extend along and engage arcuate surfaces 55 of release plates 53 and 54 with rods 62 extending between the ends of spaced shoes 43–44 and 45–46 and engaging the ends of chordal surfaces 47, (FIGS. 8 and 9). The functional features of the strap and rod assembly may be incorporated in the release plates if desired, without affecting the clutch operation.

A continuous garter spring 63 (FIGS. 8 and 9) is located between clutch shoes 43–44 and 45–46 and extends concentrically about rotor assembly 3 in engagement with strips 61 of strap and rod assembly 60. Spring 63 has a predetermined and preset tension to insure the return of release plate 53 and 54 and clutch shoes 43–44 and 45–46 to their retracted positions of FIGS. 1, 8 and 10 when shaft 2 has slowed to the clutch shoe disengagement speed. Another important feature of the invention is that spring 63 exerts only a minimum amount of retention on the clutch shoes which must be overcome by the centrifugal forces acting on the clutch shoes and release plates prior to the clutch shoes moving outwardly and engaging driven drum wall 14.

A release ball 64 is located within each clutch shoe hole 52 (FIGS. 1, 2 and 8–13). Balls 64 preferably are formed of steel and have a diameter complementary to the diameter of holes 52 so that the balls fit snugly but movably within holes 52. Release balls 64 need not have a spherical shape as shown but may be conical, cylindrical, etc. without affecting the operation of the clutch assembly. Balls 64 also are adapted to extend into U-shaped slots 59 of release plates 53 and 54 during the operation of clutch assembly 1 as described below.

The operation of improved clutch assembly 1 is described below and is shown particularly in FIGS. 8–13. Release plates 53 and 54 are held in retracted position by spring 63, with chordal surfaces 56 abutting surfaces 21 and 22 of core 17 when clutch assembly 1 is in retracted or unactuated positions, which occurswhen shaft 2 is at rest or at a relatively low speed. This inward retracted position of plates 53 and 54 forces balls 64 axially outwardly into clutch shoe holes 52 and partially into upper and lower holes 37 and 38 of side plates 26 and 27. The small portions or areas 65 (FIG. 6) of release plates 53 and 54 which are located between arcuate surfaces 55 and U-shaped slots 59 are positioned between and clamped by balls 64, preventing inward movement of the balls from their engaged positions with slide plate holes 37 and 38. This outwardly spread position of balls 64 maintains clutch shoes 43–46 at their inward retracted positions, with chordal surfaces 48 of the shoes abutting core surfaces 21 and 22, (FIGS. 1, 8 and 10).

Shoes 43–46, thus, are prevented from any outward radial movement by balls 64 which are located within shoe holes 52 and forced partially into side plate holes 37 and 38 by the force exerted on release plates 53 and 54 by return spring 63. Balls 64, likewise, are prevented from any axially inward movement by portion 65 of release plates 53 and 54.

Shoes 43–46 and release plates 53–54 attempt to move radially outwardly from their retracted positions of FIGS. 1, 8 and 10 under the influence of centrifugal force as the rotational speed of shaft 2 increases. The clamping friction developed between release plates 53–54 and balls 64 comprises the primary retention means to retain release plates 53–54 in their retracted position until shaft 2 reaches a predetermined engagement speed.

The centrifugal force increases upon shoes 43–46, release plates 53–54, and balls 64 as the speed of the driven rotor assembly increases and attempts to move these components from their retracted positions. This centrifugal force exerted on shoes 43–46 and on balls 64, forces balls 64 axially inwardly tighter against release plates 53–54 due to the pivotal or cam-like action of balls 64 against the inner edge portions 66 (FIG. 10) of side plate holes 37 and 38. Meanwhile, the retaining force of spring 63 on the clutch shoes is minimal, when compared to the frictional or clamping primary retaining force exerted by balls 64 on release plate 53–54. Spring 63 functions primarily to return the clutch shoes, release plates and balls to their retracted positions upon the speed of shaft 2 dropping below the clutch disengagement level.

Release plates 53–54 will start to overcome the clamping force of balls 64 and will move radially outwardly between each pair of balls as the rotor speed increases. This outward movement will not affect the retracted positions of shoes 43–46 until the bottom edge portions of U-shaped slots 59 reaches the position of FIG. 11, where such slot edges generally align with the center of balls 64. Clutch shoes 45–46 will automatically and instantaneously "snap" outwardly to their fully extended and engaged positions of FIGS. 2, 12 and 13 upon plates 53–54 moving outwardly just beyond the position of FIG. 11. Balls 64 move axially inwardly from their restrained positions within side plate holes 37 and 38 partially into U-shaped slots 59 of release plates 53–54. This inward movement of balls 64 is followed instantaneously by the unrestrained outward movement of shoes 43–46. Shoes 43–46, thus, will snap outwardly with clutch shoe friction surfaces 51 drivingly engaging surfaces 16 of clutch drum wall 14. Such instantaneous and forceful engagement eliminates the heretofore gradual engagement, with the undesirable slipping as in many prior clutch constructions.

This outward movement of release plates 53–54 followed by the inward movement of balls 64 and subsequent outward movement and driving engagement of shoes 43–46 occurs almost instantaneously to provide the desired "snap-in" engagement at a higher driving shaft speed than possible with known centrifugal clutch constructions of equal mass and weight, which constructions require the use of spring means to provide a main portion of the clutch shoe loading.

Figure 13:
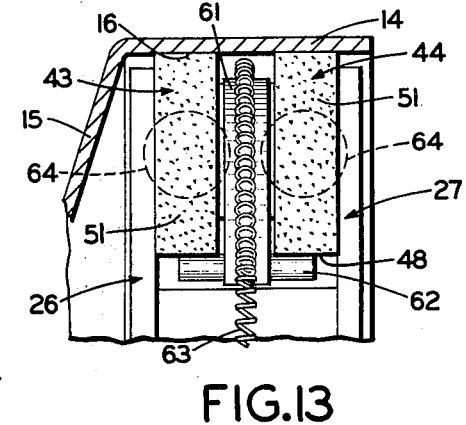
FIG. 13 is an enlarged, fragmentary, sectional view taken on line 13—13, FIG. 9.

Release plates 53–54 are prevented from contacting clutch drum wall 14 when clutch shoes 43–46 snap outwardly into engagement with drum wall 14 by strap and rod assembly 60, as shown in FIG. 13. Release plates 53–54 are restrained by steel strip 61 due to the engagement of rods 62 with the ends of chordal surfaces 48 of the clutch shoes. Strap rods 62 are disengaged from the clutch shoes when they are in retracted position (FIG. 8), with strap-rod assembly 60 being moved outwardly by the outward movement of release plates 53–54 until rods 62 engage the ends of clutch shoes chordal surfaces 48 as shown in FIG. 9. The length of strip 61 is predetermined to permit sufficient outward movement of the release plates enabling balls 64 to move inwardly into U-shaped slots 59, yet limiting the outward movment of release plates 53–54 and return spring 63 to prevent them from contacting drum wall 14 (FIG. 13).

The engagement of rods 62 with the ends of the spaced pairs of clutch shoes 43–44 and 45–46 also insures uniform outward movement of the clutch shoe pairs preventing one shoe of a pair from "hanging up" or sticking during the snap-in outward engagement of the clutch shoes.

Assume that shaft 2 is rotating in a counterclockwise direction as indicated by Arrow A, FIG. 9. Shoes 43–46 upon contactingdriven member 4 are moved rearwardly with respect to the direction of rotation of driving assembly 3 by the drive reaction from the contact of linings 52 with the drum. This drive reaction causes the clutch shoe chordal surfaces 48 to pivot and slide along roller pins 42 distributing the engagement pressure along the length of clutch shoe linings 51 and producing a self-energizing action whereby the drive reaction of the shoes forces the linings into tighter engagement with the driven drum. This self-energizing effect is somewhat similar to that which is achieved by the clutch construction shown and described in U.S. Pat. No. 3,026,980. This self-energizing action does not affect the snap-in engagement of the clutch shoes but provides an improved clutch construction having both the advantages of a snap-in instantaneous clutch shoe engagement and a self-energizing action. Various other types of self-energizing arrangements may be provided in combination with the instantaneous clutch shoe release arrangement if desired, without departing from the concept of the invention.

Clutch shos 43–46 will maintain their driving engagement with driven clutch member 4 until the speed of shaft 2 decreases to a predetermined level, which level is considerably lower than that of the engagement speed. Sufficient centrifugal force is exerted on the clutch shoes, release plates, and balls 64 to overcome the tension of return spring 63 to maintain this driving engagement at a lower speed than the engagement speed since the clamping friction force which retained these components in retracted positions has been removed. Only when the tension of spring 63 exceeds the centrifugal force exerted on these components will uncoupling or disengagement occur. Thus, the centrifugal force required to initiate the clutch coupling must be sufficient to overcome the tension of spring 63 plus the large clamping frictional engagement of balls 64 with release plates 53–54, which clamping force increases as the speed of shaft 2 increases. However, only the biasing force exerted by expanded spring 63 returns or disengages the clutch components, thereby, providing a relatively low disengagement speed with respect to the clutch engagement speed.

Figure 14:
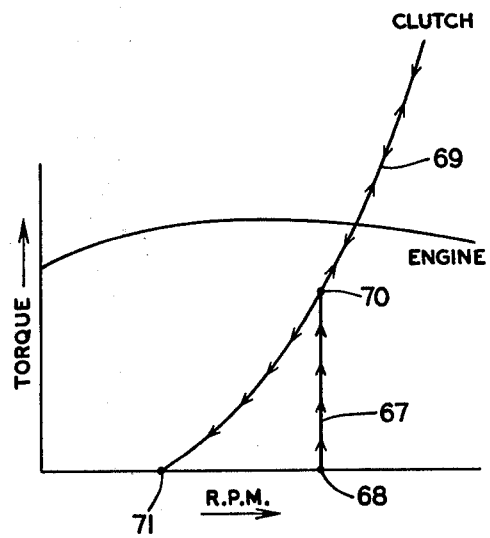
FIG. 14 is a diagram illustrating the torque-speed curve of the improved clutch construction and the engagement and disengagement characteristics thereof.

These engagement and disengagement characteristics which are achieved by improved clutch construction 1 are illustrated in FIG. 14. Vertical line 67 illustrates the instantaneous engagement of the clutch shoes with the driven clutch member 4 upon shaft 2 reaching the predetermined clutch engagement speed indicated at point 68. The engaged clutch then follows the torque-speed curve upwardly (indicated by line 69) beyond point 70. The clutch torque-speed upon decrease in the speed of shaft 2, follows line 69 downwardly past point 70 until disengagement occurs at a predetermined lower speed of shaft 2, (indicated by point 71 on the horizontal speed axis) which is considerably lower than the engagement speed at point 68.

Accordingly, improved centrifugal clutch construction 1 provides a construction which has a rapid or snap-in forceful engagement with the driven clutch member upon the driving shaft reaching a predetermined speed, which engagement speed is consideraby higher than the release or disengagement speed; provides a clutch construction which enables a relatively high engagement speed to be obtained with considerably less mass than heretofore possible with most known clutch constructions; provides a clutch construction which contains self-energizing roller pins to distribute the coupling forces along the clutch linings and which provides a self-energizing effect in a relatively simple and convenient manner; provides a clutch construction in which the clutch shoes retaining means (release plates 53–54 and balls 64) increase and aid the centrifugal engaging force of the clutch shoes immediately upon release of the clutch shoes from their retracted position; provides a clutch construction which avoids the use of springs and spring biased components as the primary retention means for the clutch shoes; and provides a construction which is simplified, effective, safe, inexpensive and efficient, which achieves all the enumerated objectives, provides for eliminating difficulties encountered with prior clutch construction and devices, and which solves problems and obtains new results in the art.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of constructon shown or described.

Having now described the features, discoveries and principles of the invention, the manner in which the improved centrifugal clutch construction is constructed, assembled and operated, the characteristics of the new construction, and the advantageous, new and useful structures, devices, elements, arrangements, parts, and combinations are set forth in the appended claims.

I claim:

1. Centrifugal clutch construction including
   a. a driven clutch member;
   b. drive shaft means having a pair of diametrically opposed surfaces;
   c. a pair of spaced radially extending side plates mounted in a fixed position on the drive shaft means for rotation with said shaft means, with the drive shaft means surfaces being located between said side plates;

d. shoe means incuding two pairs of clutch shoes, mounting between the side plates and movable radially between retracted and extended positions, with each pair of clutch shoes being supported by a respective surface of the drive shaft means when the clutch shoes are in retracted position;

e. the clutch shoes having frictional coupling surfaces adapted to drivingly engage the driven clutch member when the shoes are in extended position;

f. release plate means mounted between each pair of clutch shoes and movable radially between extended and retracted positions;

g. ball means mounted between the side plate means and operatively engaged with each of the clutch shoes and the intervening release plate means when said clutch shoes and release plate means are in retracted positions, with said ball means restraining outward radial movement of said release plate means and clutch shoes; and h. the release plate means being adapted to move radially outwardly under the influence of centrifugal force from retracted to extended position disengaging the ball means from restraining the clutch shoes when the drive shaft means reaches a predetermined speed, whereupon the clutch shoes snap outwardly from retracted to extended position and drivingly engage the driven 2. The construction defined in claim 1 in which the shoe means and side plates are formed with openings, said openings being in axial alignment when the shoe means are in retracted position; and in which the ball means are mounted within the shoe means openings and project into adjacent side plate openings, with the respective release plate means being clamped between an opposed pair of said ball means when the shoe means are in retracted position.

3. The construction defined in claim 2 in which the release plate means is formed with opening means; and in which the ball means move into said release plate opening means to disengage te release plate means from its clamped position between the opposed pair of ball means.

4. The construction defined in claim 1 in which the shoe means each have an arcuate surface and chordal surface extending between the ends of said arcuate surface; and in which frictional material is mounted on the arcuate surface providing the frictional coupling surface of the shoe means.

5. The construction defined in claim 4 in which the chordal surfaces of the shoe means are engaged by the diametrically opposed surfaces of the drum shaft means when the shoe means are in retracted position.

6. The construction defined in claim 5 in which the release plate means each has an arcuate surface having a radius of curvature generally equal to the radius of curvature of the shoe means arcuate surfaces.

7. The construction defined in claim 1 in which spring means operatively engage the release plate means to return the release plate means and shoe means to their retracted positions, and to retain said release plate means and shoe means in retracted position when the drive shaft means is stationary.

8. Centrifugal clutch construction including
a. a driven clutch member;
b. drive shaft means;
c. a pair of spaced radially extending side plates mounted in a fixed position with respect to the drive shaft means for rotation with said drive shaft means;

d. a pair of shoe means mounted between the side plates and movable radially between retracted and extended positions;

e. the shoe means each having a frictional coupling surface adapted to drivingly engage the driven clutch member when the shoe means are in extended position; the shoe means each having a pair of spaced webs with axially aligned holes formed in said webs;

f. release plate means slidably mounted between each of the shoe means spaced webs with said release plate means being adapted to move radially outwardly under the influence of centrifugal force; said release plate means being formed with opening means;

g. ball means mounted within each of the web holes and engageable with the adjacent side plate and release plate means when in retracted position clamping the interposed release plate means between a pair of the ball means to restrain the outward radial movement of said release plate means and shoe means;

h. and the release plate means moving radially outwardly when the drive shaft increases to a predetermined speed, with the clamping ball means moving into the release plate means opening means disengaging said release plate means from their clamped retracted position whereupon the shoe means snap outwardly under the influence of centrifugal force from retracted to extended position and drivingly engage the driven clutch member.

9. The construction defined in claim 8 in which each pair of shoe means includes a pair of individual clutch shoes each having an arcuate outer surface and a connecting inner chordal surface; and in which friction material is mounted on the arcuate surface to provide the frictional coupling surface.

10. The construction defined in claim 9 in which the release plate means each has an arcuate outer surface with a radius of curvature generally equal to the radius of curvature of he clutch shoes arcuate surfaces, and a connecting chordal surface having a shorter length than the chordal surfaces of the clutch shoes.

11. The construction defined in claim 8 in which each of the release plate means opening means is a U-shaped slot.

12. The construction defined in claim 8 in which the drive shaft means includes a shaft and a core block mounted in a fixed position on said shaft; in which the core block has a pair of diametrically opposed surfaces with spaced camming roller means mounted on said surfaces; and in which the shoe means operatively engage the camming roller means when drivingly engaging the driven clutch member.

13. The construction defined in claim 8 in which spring means operatively engage the release plate means to return the release plate means and shoe means to their retracted positions and to retain said release plate means and shoe means in retracted position when the drive shaft means is stationary.

14. The construction defined in claim 13 in which the spring means is a continuous garter spring extending concentrically with respect to the drive shaft means about the release plate means.

15. The construction defined in claim 8 in which a strap assemby is associated with each of the shoe means, said strap assembly incuding a pair of end rods and a metal strip extending therebetween; in which the end rods extend across and engage the ends of the spaced shoe webs; and in which the strip engages the release plates means to limit the outward radial movement of said release plate means when the shoe means are in extended position.

16. Centrifugal clutch construction including
   a. a driven clutch member;
   b. drive shaft means including a shaft and a core block mounted in a fixed position on said shaft, with said core block having a pair of diametrically opposed surfaces;
   c. spaced camming roller means mounted on the opposed surfaces of the core block;
   d. a pair of spaced radially extending side plates mounted in a fixed position on the drive shaft means for rotation with said shaft means;
   e. shoe means mounted between the side plates and movable radially between retracted and extended positions;
   f. the shoe means having a frictional coupling surface adapted to drivingly engage the driven clutch member when the shoe means is in extended position;
   g. release plate means mounted between the spaced side plates and movable radially between extended and retracted positions;
   h. ball means mounted between the side plate means and engaged with the release plate means and the shoe means when said shoe means and release plate means are in retracted positions, with said ball means restraining outward radial movement of said release plate means and shoe means; and
   i. the release plate means being adapted to move radially outwardly under the influence of centrifugal force from retracted to extended position disengaging the ball means from restraining the shoe means when the drive shaft means reaches a predetermined speed, whereupon the shoe means snap outwardly from retracted to extended position and drivingly engage the driven clutch member, and with the shoe means operatively engaging the camming roller means when drivingly engaging the driven clutch member.

17. The construction defined in claim 16 in which the shoe means includes two pairs of clutch shoes, with each pair being supported by a respective surface of the drive shaft means core block when the shoes are in retracted position; and in which the release plate means includes a pair of release plates, with each one of said release plates being located between a respective pair of the clutch shoes.

18. The construction defined in claim 17 in which the clutch shoes, release plates, and side plates are formed with openings; in which the ball means includes four balls, each of which is mounted within a respective clutch shoe opening and projecting into an adjacent side plate opening with the respective release plate being clamped between an opposed pair of said balls when the shoes are in retracted position; and in which the balls move into the release plate openings to disengage the release plates from their clamped position between the opposed pair of ball means when the release plates move radially outwardly toward extended position.

19. The construction defined in claim 17 in which a flexible strap having a pair of end rods is mounted between each pair of clutch shoes, with said straps engaging a respective release plate and the strap end rods engaging a respective pair of associated clutch shoes when the release plates and clutch shoes are in extended position to limit the outward movement of said release plates.

20. Centrifugal clutch construction including
   a. a driven clutch member;
   b. drive shaft means;
   c. a pair of spaced radially extending side plates mounted in a fixed position on the drive shaft means for rotation with said shaft means;
   d. shoe means mounted between the side plates and movable radially between retracted and extended position;
   e. the shoe means having a frictional coupling surface adapted to drivingly engage the driven clutch member when the shoe means is in extended position;
   f. release plate means mounted between the spaced side plates and movable radially between extended and retracted positions;
   g. strap means including a flexible strip of material terminating in a pair of end rods, with said flexible strip engaging the release plate means and the end rods engaging the shoe means to limit the outward movement of the release plate means when said release plate means is in extended position;
   h. ball means mounted between the side plate means and engaged with the release plate means and the shoe means when said shoe means and release plate means are in retracted positions, with said ball means restraining outward radial movement of said release plate means and shoe means; and
   i. the release plate means being adapted to move radially outwardly under the influence of centrifugal force from retracted to extended position disengaging the ball means from restraining the shoe means when the drive shaft means reaches a predetermined speed, whereupon the shoe means snap outwardly from retracted to extended position and drivingly engage the driven clutch member.

21. Centrifugal clutch construction including
   a. a driven clutch member;
   b. drive shaft means;
   c. a pair of spaced radially extending side plates mounted in a fixed position on the drive shaft means for rotation with said shaft means;
   d. a pair of shoe means mounted between the side plates on diametrically opposite sides of the drive shaft means and movable radially between retracted and extended positions;
   e. the shoe means each having a frictional coupling surface adapted to drivingly engage the driven clutch member when the shoe means are in extended position;
   f. a pair of release plate means, each of which is mounted between the spaced side plates and operatively engageable with a respective shoe means and movable radially between extended and retracted positions;
   g. a pair of strap means, each of which is operatively engageable with a respective shoe means and associated release plate means to limit the outward movement of the release plate means when in extended position;
   h. a coil spring extending concentrically about the drive shaft means and operatively engageable with both release plate means biasing said release plate means toward retracted position;

i. ball means mounted between the side plate means and engaged with the release plate means and the shoe means when said shoe means and release plate means are in retracted positions, with said ball means restraining outward radial movement of said release plate means and shoe means; and j. the release plate means being adapted to move radially outwardly under the influence of centrifugal force from retracted to extended position disengaging the ball means from restraining the shoe means when the drive shaft means reaches a predetermined speed, whereupon the shoe means snap outwardly from retracted to extended position and drivingly engage the driven clutch member.

* * * * *

UNITED STATES PATENT AND TRADEMARK OFFICE
CERTIFICATE OF CORRECTION

PATENT NO. : 4,020,936
DATED : May 3, 1977
INVENTOR(S) : Richard C. St. John

It is certified that error appears in the above-identified patent and that said Letters Patent are hereby corrected as shown below:

Column 1, line 34, change "are" to --use--;
Column 2, line 17, change "for" to --of--;
Column 2, line 23, change "strudy" to --sturdy--;
Column 2, line 64, change "openingmeans" to --opening means--;
Column 4, line 6, change "acylindrical" to --a cylindrical--;
Column 4, line 21, change "surface" to --surfaces--;
Column 4, line 33, change "coonfigurations" to --configurations--;
Column 5, line 20, change "47" to --48--;
Column 5, line 29, change "plate" to --plates--;
Column 5, line 54, change "occurswhen" to --occurs when--;
Column 6, line 50, change "snap" to --"snap"--;
Column 6, line 40, change "45" to --43--;
Column 7, line 12, change "movment" to --movement--;
Column 7, line 23, change "contactingdriven" to --contacting driven--;
Column 7, line 44, change "shos" to --shoes--;
Column 8, line 14, change "snap-in" to --"snap-in"--;
Column 9, line 1, change "incuding" to --including--;
Column 9, line 27, add --clutch member-- after "driven";
Column 9, line 41, change "te" to --the--;
Column 9, line 44, add --a-- between "and" and "chordal"; and
Column 10, line 43, change "he" to --the--.

Signed and Sealed this second Day of August 1977

[SEAL]

Attest:

RUTH C. MASON
Attesting Officer

C. MARSHALL DANN
Commissioner of Patents and Trademarks